United States Patent [19]

Forsythe et al.

[11] Patent Number: 5,088,051
[45] Date of Patent: Feb. 11, 1992

[54] USER INVISIBLE, PRINTER LINE CONNECTED TELECOMMUNICATIONS LINK

[75] Inventors: Robert G. Forsythe, Richmond Heights; Brian J. Barnt, Rocky River, both of Ohio; Karl Rautenkranz, Tucson, Ariz.; Fred R. Schraff, Cleveland; William H. Davis, Fairview Park, both of Ohio

[73] Assignee: Medical Payment Systems, Westlake, Ohio

[21] Appl. No.: 478,821

[22] Filed: Feb. 12, 1990

[51] Int. Cl.⁵ ............................................. G06K 15/00
[52] U.S. Cl. ............................................. 395/117
[58] Field of Search ...................... 364/518-520, 364/930 MS File, 235 MS File, 940.61 MS File, 940.62 MS File, 401, 405, 403; 346/154; 370/43; 400/61, 62, 67, 68, 76

[56] References Cited

U.S. PATENT DOCUMENTS

| 4,345,315 | 8/1982 | Cardotte et al. | 364/900 |
|---|---|---|---|
| 4,604,696 | 8/1986 | Suganuma et al. | 364/401 |
| 4,625,275 | 11/1986 | Smith | 364/401 |
| 4,819,162 | 4/1989 | Webb, Jr. et al. | 364/401 |
| 4,831,526 | 5/1989 | Luchs et al. | 364/401 |
| 4,858,121 | 8/1988 | Barber et al. | 364/406 |
| 4,941,091 | 7/1990 | Breault et al. | 364/406 |

Primary Examiner—Arthur G. Evans
Attorney, Agent, or Firm—Fay, Sharpe, Beall, Fagan, Minnich & McKee

[57] ABSTRACT

A personal computer (A) generates print data which is conveyed from its printer output port (16) along a printer cable (18) to an associated printer (B). A remote telecommunications unit (C) is connected with the printer cable to receive the print data at an input port (20), pass the data from a printer output port (22) to the printer, and pass print data from a telecommunications port (52) to a telephone communications line (54). The print data is intercepted and a copy is stored in a disk memory (40). A dial-up means (42) dials the phone number of a central processing computer modem (60) to establish a telecommunications link. Thereafter, a telecommunications controller (48) conveys the print data from the disk memory to the modem (60). A form identification means (62, 62') identifies to which of a plurality of preselected forms each page of print data corresponds. From the generated form identification, a corresponding map (66, 66') is selected. A data reader (68) uses the selected map in order to read the data from each form or page in the same order and format that a central data processor (70) previously received the data. Alternately, the disk memory (40) may be removed from the remote processing unit, mailed to the central processor, and the data from the form can be processed directly without intervening telephone lines.

11 Claims, 3 Drawing Sheets

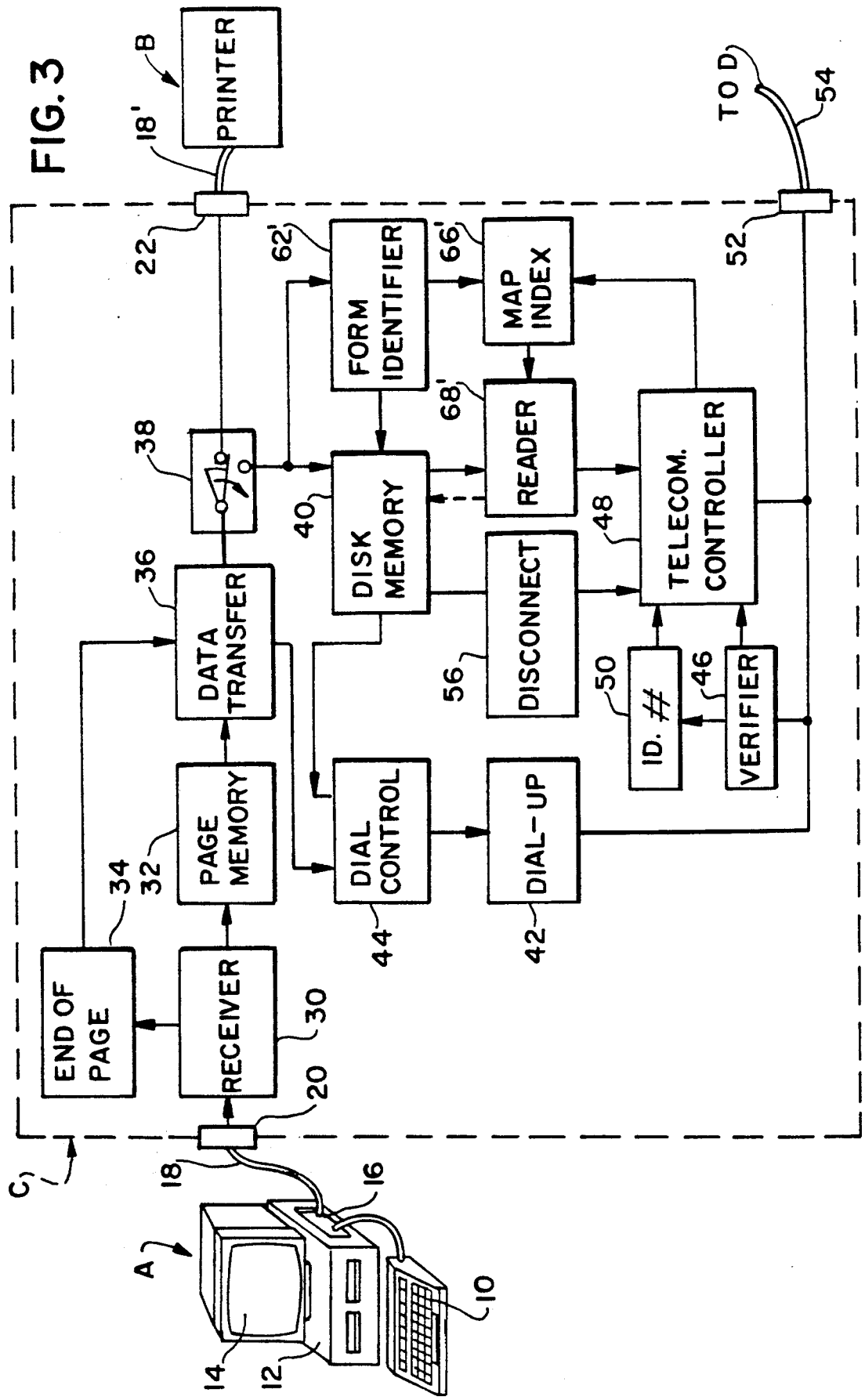

5,088,051

USER INVISIBLE, PRINTER LINE CONNECTED TELECOMMUNICATIONS LINK

BACKGROUND OF THE INVENTION

The present invention relates to the data processing arts. It finds particular application in conjunction with the transmission of medical claims data from a physician's office to a central medical claims processing computer and will be described with particular reference thereto. However, it is to be appreciated that the present invention will find application in other areas, such as transmitting shipping data to a central inventory control computer system, transmitting check or invoice data to a central accounting program, and the like.

Heretofore, doctors have used printed, paper claims to communicate medical insurance information to insurance companies. To facilitate its own processing of the paper claims, each insurance company has a standardized claim format. However, the claim format varies from insurance company to insurance company.

These systems commonly include a small computer, an entry terminal, suitable software, and a printer. The software processes the entered medical service, patient, and insurance information and controls the printer to print a medical claim form of the appropriate form for the patient's insurance company. Commonly, the software does other processing of value to the physician, such as monthly reports, accounting statements, word processing, or the like.

There are currently thousands of different computerized medical insurance claim printing systems in physicians' offices. These systems run on numerous different models of computers provided by various manufacturers with different operating systems, and, of course, different software.

Manual entry of the medical service and patient information in the physician's office to generate the printed form and manual entry at the insurance company from the printed form into its computer is a duplication of man power. It would be desirable to make an electronic transfer of data from the physician's office to the insurance company's computer. However, this would entail replacing or reprogramming the existing computerized insurance claim printing systems. This arduous task is rendered more difficult by the lack of technical support for many of the installed systems.

Similar problems are encountered in other types of data processing in which information is manually entered to generate a paper output and entered again for central processing. For example, in shipping invoice printing systems, shipment information is normally entered manually to generate a shipping label and invoice. The inventory system is commonly on a different computer which is not compatible with the invoice printing system. Inventory information is again manually entered into the central inventory system in a duplication of labor.

The present invention contemplates a new and improved data transmission system which overcomes the above referenced problems and others.

SUMMARY OF THE INVENTION

In accordance with the present invention, an electronic "black box" is connected between the printer output of the computer and the printer. Electronic messages pass through the box unaltered such that insurance claims are printed as always. The box includes a telephone modem for making a telephone connection with a central processing system. A form recognition means monitors selected fields to recognize each printed form. The form recognition means addresses a map means which maps the correspondence between the fields of the printed form and the patient and medical service information normally input into the central processing system.

In accordance with another aspect of the present invention, a method of processing data is provided. Print commands and fields of printed data are tapped off the line between a computer and a printer and transmitted to a central processing system. Selected fields of the printed data are examined and a corresponding map is identified. The tapped print fields are mapped using the identified map into corresponding input information for a central processing system.

One advantage of the present invention is that it enables the output of numerous different processing systems to be accommodated with no modification to the user terminals.

Another advantage of the present invention is that it can have no adverse effect on the computer program of the user terminal.

Another advantage of the present invention is that it enables printed form information to be entered directly into a central processing system without manual intervention.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components or in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
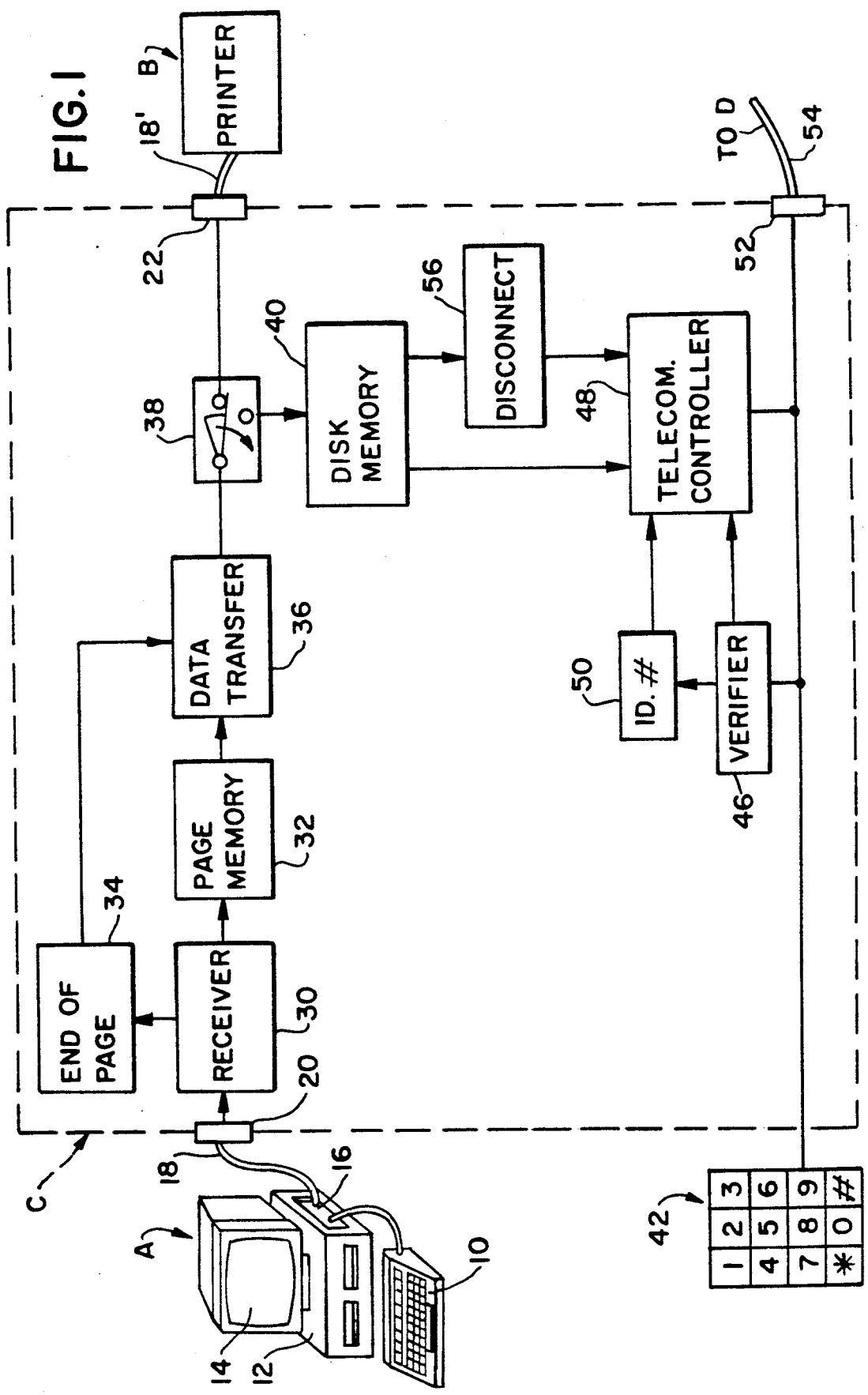
FIG. 1 is a diagrammatic illustration of an electronic telecommunications link in accordance with the present invention.

With reference to FIG. 1, a user computer A such as a personal computer receives input data, processes it, and generates printer command signals. More specifically, the personal computer includes a data entry means such as a keyboard 10 through which an operator inputs data, such as medical claims and patient data into a processor 12. A video display 14 provides feedback to the operator regarding input data and the like. The processor includes a printer port 16 to which a printer cable 18 is connected. Normally, the printer cable connects at its other end directly to a printer B.

A "black box" or telecommunications means or link C has an input port 20 of the same configuration as the port or jack on the printer B. The printer cable 18 connects the processor printer port 16 directly to the telecommunications link input port 20. The telecommunications link also has an output port of the same configuration as the printer port 16. A second printer cable 18' which is identical to the printer cable 18 interconnects the output port of the telecommunications link with the input port of the printer. Of course, the black box can also be configured in a software program of the computer terminal A that performs the below described print data processing.

The telecommunications link C has a print data path between the input port 20 and the printer output port 22 along which print data passes on its way from the computer terminal A to the printer B. The print data path includes a receiving means 30 which receives print data from the input port 20. Commonly, the print data includes a selected number of character spaces per line and lines per page. Each character space can have a character or a space. In order to print forms, the print information normally includes a large number of spaces with print characters only in preselected fields, i.e. preselected lines and at preselected positions within each line. In this manner, the characters are printed in the appropriate location in the form being printed. At the end of each page, the print data may include an end of page or feed designation to instruct the printer to feed the next sheet to be printed. It is to be appreciated that forms with different layouts have the spaces and printed characters in different positions or fields. Moreover, forms which request information in different orders may have common numeric and alphabetical character sets that describe the patient or service in different positions. For example, a form which starts with the date would have an all numeric first character set; whereas, a form that starts with a patient's name would have an all alphabetical initial character set.

The received printed data is stored in a memory means 32. An end of page monitoring means 34 monitors the received data for the end of page or sheet feed designation. Upon receipt of a preselected number of the end of page or sheet feed designations, e.g. one, the monitoring means 34 enables a data transfer means 36. The data transfer means 36 transfers or passes the preselected number of pages of data in the page memory means 32. A mode selection switch determines whether the page of data will pass (i) to the printer, (ii) to a central processing system D, or (iii) to both. When the page is to be transferred to the printer, the mode selection switch 38 connects the data transfer means with the printer output port 22. Because the telecommunications link C does not modify or in any way alter the print data passed along the printed data path, the personal computer A cannot tell that it did not go directly to the printer and the printer B cannot tell that it did not receive the data directly from the personal computer.

Print data which is to be transmitted to the remote processing site D is conveyed by the mode selection switch 38 to a large capacity memory means such as a disk memory 40. A dial-up means 42 establishes a data link with the central processing computer D when it is appropriate to transfer information from the disk memory 40. The dial-up means may be operator controlled, e.g. a touch-tone dial, or may be automatically controlled.

After the dial-up means 42 has dialed up the central processor, a verification means 46 verifies that a good telephone connection has been made. The verification means, preferably, interrogates the computer of the central processing system with code words or the like to assure that a telephone connection to the proper number has been made. The verification means may also transmit and receive a preselected data sequence in order to assure that the telephone connection is clean and static free.

Once the verification means 46 has verified the telephone connection, it enables a telecommunications control means 48 and a telecommunications link identification means 50. The telecommunications controller first receives the transmitting unit identification number from the identification means 50 and communicates that to a telephone outlet port 52 which is connected by a phone or other communications line 54 to the central processing unit D. The telecommunications controller then interrogates the large capacity memory means 40 and transmits the data therefrom to the telephone outlet port 52, hence to the central processor. A disconnect means 56 monitors the memory 40 to determine when all the print data has been transferred. Upon completion of the data transfer, the disconnect means 56 causes the telecommunications controller 48 to terminate the telephone link. Optionally, the disconnect means 56 may monitor for other conditions, such as a noisy telephone connection, a large number of error messages from the central processor or the like to terminate the transfer of data.

Figure 2:
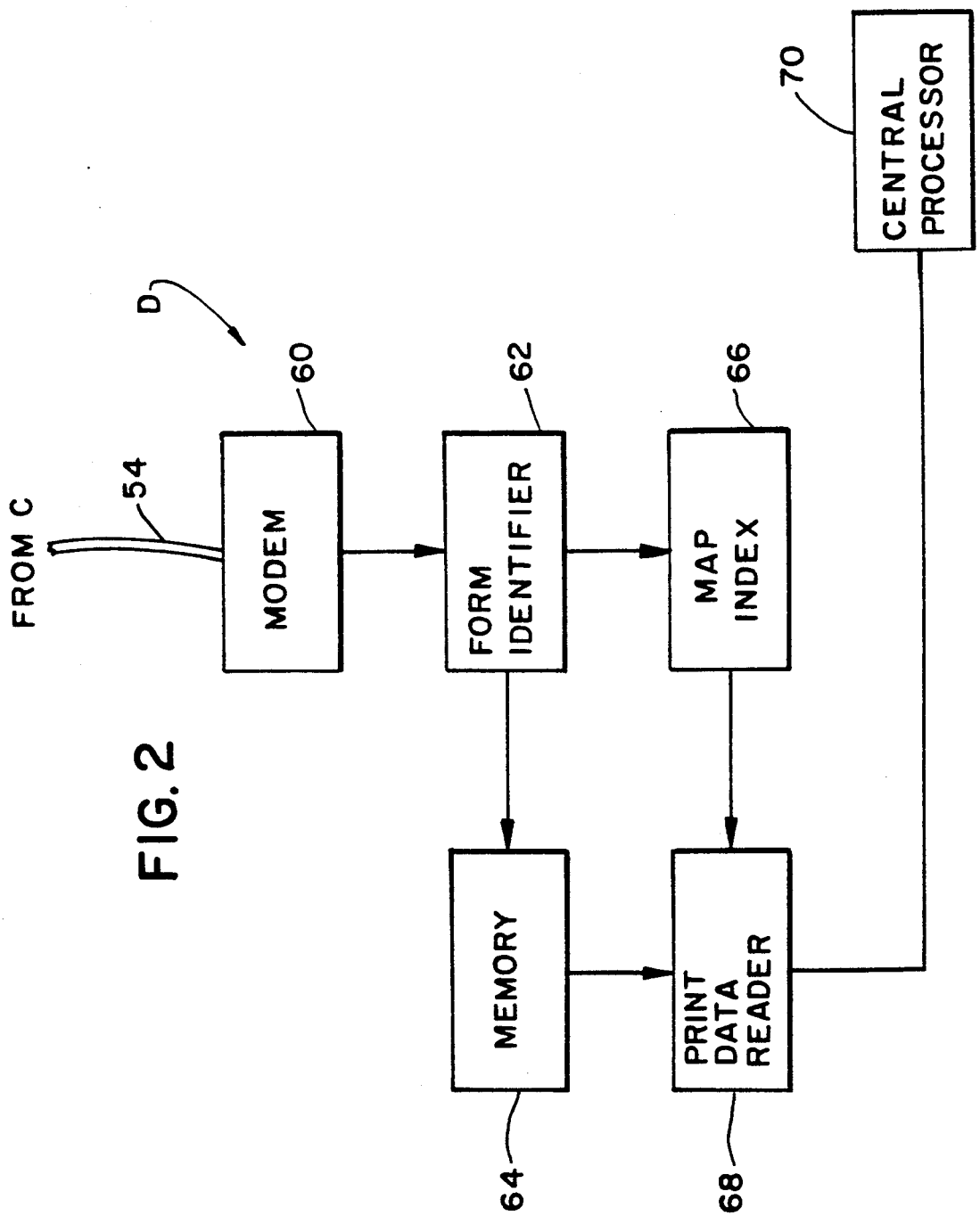
FIG. 2 is a diagrammatic illustration of data handling at a central processing computer; and, FIG. 3 is a diagrammatic illustration of an alternate embodiment.

With reference to FIG. 2, the central processing system D has a modem 60 at which the telephonically transmitted print data is received. This data is still in the print format of space, alphanumeric character, end line, and end page instructions. If one were to connect a printer to the modem, the forms could be printed from the modem.

The central processing system functions as a clearing house for one or more selected insurance companies. Accordingly, the print data is formatted for a distinct number of known and predictable forms. By comparing these forms formats, one can readily determine distinguishing characteristics for each of them. These characteristics may include the position of the first printed data, the order in which data such as a date and patient number are printed, a form or identification number, or the like. A form identifying means 62, preferably a computer program, passes the received data to a memory means 64 and identifies each form. A form identification is transmitted to a map index 66 which has a map of each of the plurality of preselected forms. Each map translates position within the form to an indication of the significance of the data, e.g. which field is the date, the patient name, patient number for the insurance carrier, medical service codes, and the like. A data reading means 68 is controlled by the addressed map in order to read the data from the memory means 64 in the appropriate order or with any appropriate additional identifications or information that is normally presented to a claims processing means 70. The claim processing means is the same processing means into which data had previously been entered manually from the printed claims forms. In this manner, the modem and mapping or translation means 60 convert the print data into the same form as the data previously received by the claims processing system, but without the intervention of a human operator.

In some installations, telecommunications links are not reliable. In some geographic regions, data quality telephone lines are not readily available. Likewise, in some applications, the communications speed of a telecommunications link is not cost justified. In these and other appropriate applications, the disk memory 40 may include a floppy disk that is removed from time to time and replaced with a new disk. The removed disk is then mailed or otherwise sent to the central processing system where it is read into the central processor analogous to the data read in by the telephone link. In the embodiment in which the disk 40 is mailed or messengered to the central processing system, the modem 60 is replaced with a disk reader which reads the information off the disk to the form identifying means 62.

FIG. 3 illustrates an alternate embodiment in which like elements with the embodiments of FIGS. 1 and 2 are identified with like reference numerals. For simplicity of explanation, reference should be had to the like numbered elements of FIGS. 1 and 2. The embodiment of FIG. 3 differs from the other embodiment in two primary aspects. First, the central processor D is dialed up automatically rather than manually. Second, the form identification and mapping functions are performed in the telecommunications link C rather than the central processing system D.

Although the dial-up means 42 may again be controlled manually, an automatic dial control means 44 is illustrated for automatically causing the dial-up means to dial preselected numbers at appropriate times. For example, claims data may be entered throughout the business day. The dial control means may include a clock or timer for actuating the dial-up means after the normal close of business for a once a day transfer. This type of transfer is particularly effective for systems which have a continuous print format, i.e. the forms are printed as each page of data is entered. Other claims printing systems have a batch print format in which claim information is entered throughout the day but claims forms are printed only once, generally in a batch at the end of the day. As yet another alternative, the dial control means may be connected with the data transfer means 36 to determine when the batch printing is initiated and when the batch printing finishes. For example, after commencement of the printing operation, the failure to print any additional forms for a preselected duration can be taken as the end of the batch printing process, causing the dial control means to initiate dialing. The dialer control means may also be connected with the large capacity memory 40 to monitor how full it is. When a sufficient amount of data has been received that the memory 40 is becoming full, the dial control means may actuate the dial-up means 42 to empty the memory. Various other manual, operator reminder, and automatic control conditions, as are appropriate to the selected installation, may also be selected.

As data from each form is transferred to the large capacity or disk memory 40, it is monitored by a form identification means 62'. The form identification means supplies an appropriate form identification to the disk memory 40 for storage with the data. The form identification means also addresses a map index 66' which retrieves a corresponding map that maps between the identified form and a standardized compact storage format. A memory reading means 68' under the control of the indexed map reads the data from the disk memory, reorganizes it in accordance with the map, and returns it to the disk memory in the standardized storage format.

As a part of establishing a telecommunications link with the central processor 70, the telecommunications controller 48 receives an identification of the central processor. If the central processor processes data received in more than one format, such as a clearing house which processes data for more than one insurance company, or an insurance company that processes different classes of claims in different formats, then a further identification may be provided by the form identifier, from the central processor itself, or as part of the dial-up procedure. The telecommunications controller addresses the map index with a designation of the appropriate processor identification such that a corresponding map is retrieved. The reader 68' then reads the data from the disk memory 40 in accordance with the designated map and conveys it through the telecommunications controller 48 to the modem 60 and the central processor 70.

Various alternatives to the mapping procedure may be provided. For example, the form identification means 62' may provide a complete identification of not only the form in which the data is being received, but also an identification of the central processor to which the data will ultimately be sent. With this information, an appropriate map may be retrieved from the map index 66' to enable the data to be stored in an appropriate format in the disk memory 40 such that no mapping is required as it is read out. As yet another alternative, the data may be retained in the disk memory in the same format that it is received. When the data is to be transferred to the central processing system, the map index is addressed with the appropriate form identification and, if appropriate, an identification of the central processing system to which it is being sent. The data is mapped as it is read from the memory 40 and transferred to the telecommunications port 52.

The invention has been described with reference to the preferred embodiment. Modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the invention is now claimed to be:

1. A data manipulating system comprising:
   a remote telecommunications means which intercepts print data passing from a remote computer means to a printer and which transmits the intercepted print data on a communication line to a central processing system that includes a computer program for processing data of the type intercepted;
   a data format translating means which translates print data received on the communication line into a preselected data format of data normally received by the central processing system data processing program.

2. The system as set forth in claim 1 wherein the translating means includes:
   a form identifying means which examines each page of print data and determines one of a plurality of preselected form identifications;
   a map means which is addressed by the determined form identification to retrieve a corresponding map which maps the received print data into the preselected data format.

3. The system as set forth in claim 1 wherein the remote telecommunications means includes:
   an input port which receives print data from a printer port of the remote computer means;
   a printer output port for connection with an input port of a printer;
   a data path for passing print data from the input port to the output port;

a telecommunications port which is connected with the communications line; and, a telecommunication control means for passing the print data from the print data path to the telecommunications port.

4. The system as set forth in claim 3 wherein the remote telecommunications means further includes a dial-up means operatively connected with the telecommunications port for dialing a telephone number of a modem at the central processing system.

5. The system as set forth in claim 4 further including a verification means operatively connected with the telecommunications port for communicating with the central processing system to verify that a valid data communications link has been made with the central processing system, the verification means being connected with the telecommunications control means to enable the passing of print data thereby.

6. The system as set forth in claim 5 further including a remote unit identification memory means which is enabled by the verification means to pass a remote unit identification number to the central processing system.

7. The system as set forth in claim 4 further including an automatic dial-up control means for automatically controlling dial-up means to dial selected numbers.

8. The system as set forth in claim 5 further including a memory means for storing data received from the print data path, the telecommunications control means being operatively connected with the memory means for selectively passing stored data therefrom to the telecommunications port.

9. The system as set forth in claim 3 wherein the print data path includes:

a receiving means for receiving print data, a print data storage means for storing a preselected amount of print data received by the receiving means, a data transfer means for transferring print data from the print data storage means to the printer output port and a data transfer control means for monitoring the received print data and enabling the data transfer means in response to a preselected data condition.

10. The system as set forth in claim 9 further including a mode selection switch means for selectively switching the data transferred by the data transfer means to at least one of the printer output port and a memory means for storing data received from the print data path, the telecommunications control means being operatively connected with the memory means for passing stored data therefrom to the telecommunications port.

11. In a computer system in which a first computer means generates print data which is communicated to a printer to be printed in a print format and in which analogous data is entered in an entered data format into a central processing computer, the improvement comprising:

intercepting the print data between the first computer means and the printer;

analyzing the intercepted print data to identify one of a plurality of preselected form identifications;

mapping the print data from the print format to the entered data format; and, entering the mapped data into the central processing computer.

* * * * *